United States Patent
Prizmich (10) Patent No.: US 7,300,063 B1
(45) Date of Patent: Nov. 27, 2007

(54) VEHICLE DOLLY TO ENABLE THE ROLLING TRANSPORTATION OF A DAMAGED VEHICLE

(76) Inventor: Ivo Prizmich, 10348 Jardine Ave., Sunland, CA (US) 91040

( * ) Notice: Subject to any disclaimer, the term of this patent is extended or adjusted under 35 U.S.C. 154(b) by 0 days.

(21) Appl. No.: 11/092,178

(22) Filed: Mar. 28, 2005

(51) Int. Cl.
*B62B 3/04* (2006.01)

(52) U.S. Cl. .................. 280/79.4; 280/47.15; 280/767

(58) Field of Classification Search ............ 280/79.11, 280/79.2–4, 47.11, 47.15, 47.19, 63, 79.7, 280/64, 47.34–35, 767, 638; 16/35 R
See application file for complete search history.

(56) References Cited

U.S. PATENT DOCUMENTS

| | | | |
|---|---|---|---|
| 1,661,889 A * | 3/1928 | French et al. ............... | 16/35 R |
| 2,422,892 A * | 6/1947 | Forbes et al. ............... | 16/35 R |
| 2,812,086 A * | 11/1957 | Kuenzi ...................... | 414/429 |
| 4,238,951 A * | 12/1980 | Grainger et al. .............. | 72/457 |
| 4,404,838 A | 9/1983 | Hare | |
| 4,463,937 A | 8/1984 | Celette | |
| 4,483,042 A * | 11/1984 | Dieter ....................... | 16/35 R |
| 4,510,790 A | 4/1985 | Hare | |
| 4,573,337 A | 3/1986 | Papesh | |
| 4,674,726 A | 6/1987 | Roux | |
| 4,761,984 A | 8/1988 | Fuscaldo | |
| 4,986,107 A | 1/1991 | Peyret | |
| 5,016,465 A | 5/1991 | Papesh | |
| 5,505,425 A | 4/1996 | Shelton | |
| 5,547,206 A * | 8/1996 | Hodges ................... | 280/47.15 |
| 5,620,192 A | 4/1997 | Demongin | |
| 6,095,746 A | 8/2000 | Bergin | |
| 6,308,550 B1 | 10/2001 | Papesh | |
| 2001/0029643 A1* | 10/2001 | Schroeder et al. .......... | 16/35 R |
| 2004/0227316 A1* | 11/2004 | Drummond .............. | 280/79.11 |

* cited by examiner

*Primary Examiner*—Christopher P. Ellis
*Assistant Examiner*—Vaughn T. Coolman
(74) *Attorney, Agent, or Firm*—Thomas I. Rozsa (57) ABSTRACT

A vehicle dolly on which the vehicle can rest and which can be attached to either the rocker panel of the vehicle or positioned so that the vehicle can rest on it if there are no rocker panels, so that the vehicle which is non-drivable either because it has no engine in it or because it has been badly damaged in an accident, can be easily pushed to any location in the body shop or in a home repair garage, or can be more easily towed up the ramp to a flat bed truck.

10 Claims, 3 Drawing Sheets

VEHICLE DOLLY TO ENABLE THE ROLLING TRANSPORTATION OF A DAMAGED VEHICLE

BACKGROUND OF THE INVENTION

1. Field of the Invention

The present invention relates to the field of apparatus which enable the transportation of a damaged vehicle. In particular, the field of the invention relates to devices which can be attached to the underside of a vehicle when one or more wheels are missing or if the vehicle is otherwise undrivable, to enable limited rolling transportation of the vehicle either within a repair body shop or onto a transportation flat bed truck.

2. Description of the Prior Art

In general, devices which are attached to a vehicle to permit limited rolling transportation of the vehicle are known in the prior art. The following twelve (12) patents are relevant to the field of the present invention:

1. U.S. Pat. No. 4,404,838 issued to Hare on Sep. 20, 1983 for "System For Straightening Bent Automobile Bodies" (hereafter the "'838 Hare Patent");
2. U.S. Pat. No. 4,510,790 issued to Hare on Apr. 16, 1985 for "Body And Frame Straightening System" (hereafter the "'790 Hare Patent");
3. U.S. Pat. No. 4,463,937 issued to Celette on Aug. 7, 1984 for "Apparatus For Gauge Block For The Inspection And/Or Repair Of Motor Vehicle Bodyworks" (hereafter the "Celette Patent");
4. U.S. Pat. No. 4,573,337 issued to Papesh on Mar. 4, 1986 for "Frame To Hold Auto Bodies For Straightening" (hereafter the "'337 Papesh Patent");
5. U.S. Pat. No. 4,674,726 issued to Roux on Jun. 23, 1987 for "Support Truck For Vehicle Or Equipment" (hereafter the "Roux Patent");
6. U.S. Pat. No. 4,761,984 issued to Fuscaldo on Aug. 9, 1988 for "Apparatus For Supporting A Vehicle For Straightening And Alignment" (hereafter the "Fuscaldo Patent");
7. U.S. Pat. No. 4,986,107 issued to Peyret on Jan. 22, 1991 for "Rack For Assembling, Inspecting And Repairing Vehicle Bodies" (hereafter the "Peyret Patent");
8. U.S. Pat. No. 5,016,465 issued to Papesh on May 21, 1991 for "Bench Mount Puller Support" (hereafter the "'465 Papesh Patent");
9. U.S. Pat. No. 5,505,425 issued to Shelton on Apr. 9, 1996 for "Wheeled Support For Vehicles" (hereafter the "Shelton Patent");
10. U.S. Pat. No. 5,620,192 issued to Demongin on Apr. 15, 1997 for "Vehicle Support System" (hereafter the "Demongin Patent");
11. U.S. Pat. No. 6,095,746 issued to Bergin on Aug. 1, 2000 for "Motorcycle Maneuvering Apparatus" (hereafter the "Bergin Patent");
12. U.S. Pat. No. 6,308,550 B1 issued to Papesh on Oct. 20, 2001 for "Modular Mobile Automotive Design Branch" (hereafter the "'550 Papesh Patent");

The '838 Hare Patent is a system for strengthening bent automobiles and discloses a clamping mechanism which is attached to the automobiles which is No. 48. Specifically, referring to Column 3, line 9, the patent states "Each side rail 30 mounts slidably along itself by means of a length of tubing, or slide tube 44, a pair of holding devices 46, each with an auto-body-holding clamp 48 composed of an upwardly open set of a vise-like fixed jaw 50 and movable jaw 52 clampable against it by machine screws 54 operable from the outboard side." This device is not designed to move the vehicle, but simply to have the vehicle clamped so that it can be pushed or pulled in any direction so that the vehicle can be straightened out.

The '790 Hare Patent is a continuation-in-part of the '838 Hare Patent which basically adds a few features to the disclosure in the '838 Hare Patent but is essentially the same invention and as set forth above.

The Celette Patent is a gauge block which is used for inspection and repair of automobiles. It discloses wheels 3 which enable the entire block to be rotated for the vehicle to be moved and it also discloses clamping jaws which have variations such as 15a, 15b, and 15c by which the gauge block clamps onto certain portions of the automobile as best illustrated in FIG. 1. However, the vehicle must be jacked up in order to be placed onto this device and therefore, the device is a one unitary structure having longitudinal beams 1 and crossbeams 2 onto which is attached various members to support the gripping members.

The Papesh Patent discloses a frame structure which holds auto bodies for strengthening. Referring to FIG. 1, the adjustable bed has a frame 2 having a pair of spaced apart side members 4 and 6 connected to each end region by a pair of end members 8 and 10. These members are mounted on swivel rollers 64 where the frame can be moved in any direction. The patent also discloses the concept of auto body clamps 82 which are attached to the frame member. The clamps include a fixed jaw member and a movable jaw member to clamp the structure onto a vehicle. What this patent does disclose is the concept of the swiveling wheels as well as clamping members.

The Roux Patent discloses a device to support a car or truck by means of one support truck as illustrated in FIG. 5 or two support trucks as illustrated in FIG. 6. In order to transport a vehicle after the vehicle has been lifted up, either one truck as shown in FIG. 5 or two trucks as shown in FIG. 6 are slid under the vehicle, and cross members 3 are used to obtain adequate steadiness of the vehicle and adjust the spacing and height of the plugs 16 so as to set them under the lifting points of the vehicle.

The Fuscaldo Patent discloses with reference to FIGS. 1 and 2, an apparatus which has a pair of crossbars 2 and 3 and a bench frame 4 attached to the undersides of the crossbars. Referring to FIG. 1, it is also noted that positioned on the upper surface of the crossbar 2 is a pair of clamping brackets only one of which 13 is shown in FIG. 6. Further, at each end of the cross beam, there are vertical towers 5 and 6 and each tower 5 and 6 of crossbar 2 is pivotably connected to a wheel or roller assembly indicated generally at 21 and best shown in FIG. 9.

The Peyret Patent is also a rack for assembling and inspecting and repairing a vehicle and it has features such as wheels which enable the vehicle to be rolled to other locations. The rack is formed of rectangular tubing which has two side members which are joined by two cross members. The side members have guide rails and grooves which allow quickly adjustable positioning of various supports and accessories. The side members and cross members have a plurality of formed holes at spaced intervals to accept locating dowels for the proper positioning of supports and base plates. The supports and base plates are mounted with a quick clamping mechanism.

The '465 Papesh Patent is a bench mounted puller support. This patent discloses the wheels on which the device can be rolled and also discloses the clamps.

The Shelton Patent discloses the concept of two separate dolly assemblies which can be attached by a longitudinal beam as best illustrated in FIG. 1. Specifically, the vehicle has two separate support members that can be connected by a center member of variable length. Each support member has casters for easy rolling and a vertically adjustable beam for varying the height of the support. When two support members are connected by the center member, the vehicle support is formed. The members 35 and 36 are designed to support a vehicle at one end and are designed to support it by its axles as opposed to clamping members.

The Demongin Patent is a vehicle support system. Specifically, as set forth in Column 2 beginning on Line 44, the patent states "FIG. 2 is a frontal view of the complete system, which is comprised of two dollies and a common axle, 1. Each dolly may be positioned laterally on the axle that passes through a locking collar 2, through the two apertures in the sides of the chassis 3, and through another locking collar. The axle may then be locked in place with suitably located set screws 13. FIG. 3 shows a perspective view of the vehicle support system with a vehicle mounted on the clevis pads. This view demonstrates how a wheel may be removed from the vehicle without hampering its mobility. That is, the vehicle can be moved about and directed through the versatility of the pivoting castors 4. When a suitable location for the vehicle is reached, this location can be fixed by setting the castor brakes 15." The invention provides dollies that may be conveniently spaced under a vehicle and then locked into position on a common axle. Further, the castors located on the dollies may be locked to provide a fixed work station. It appears that the device is designed to rest the vehicle in a stationary position as opposed to moving it.

The Bergin Patent discloses a motorcycle maneuvering apparatus which includes a front dolly member having wheels, a pair of frame sections mounted thereupon, a pair of cross members secured to the frame sections, and a pair of tire support members threaded upon the cross members. It also includes a rear dolly member having wheels and a pair of frame sections mounted thereupon, and a pair of cross members secured to the frame sections and a pair of tire support members. Specifically, the apparatus 10 comprises a front dolly member 11 having a plurality of wheels 12, a pair of elongated frame sections 13 and 14 conventionally supported upon the wheels 12, a pair of cross members 15 and 16 spaced apart and interconnecting frame sections 13 and 14 and a pair of elongated adjustable tire support members 17 and 19. There is also a rear dolly apparatus with comparable features. This device is designed to move a motorcycle and it is supported on the tires as opposed to being supported on the rocker panels or underneath the vehicle.

The '550 Papesh Patent discloses a modular mobile bench 2 for supporting a vehicle chassis. It includes a pair of laterally extending support members 12 including a first lateral support member 14 and a spaced apart second lateral support member 16 extending parallel to lateral support member 14. Four transport wheels 72 are connected to respective outer ends 74 and 76 of each lateral support member 14 and 16 to enable rolling the modular mobile bench from one location to another.

There is a significant need for an improved vehicle dolly system which can come in a kit form for rapid assembly to enable limited transportation of a damaged vehicle.

SUMMARY OF THE INVENTION

The present invention is a vehicle dolly on which the vehicle can rest and which can be attached to either the rocker panel of the vehicle or positioned so that the vehicle can rest on it if there are no rocker panels, so that the vehicle which is non-drivable either because it has no engine in it or because it has been badly damaged in an accident, can be easily pushed to any location in the body shop or in a home repair garage, or can be more easily towed up the ramp to a flat bed truck.

It has been discovered, according to the present invention, that if the dolly includes widthwise adjustment means, then the width of the dolly can be adjusted to accommodate the width of any desired vehicle so that the dolly mechanism can be clamped to the rocker panel on each side of the vehicle or positioned so that the entire width of the vehicle is supported by the dolly.

It has also been discovered, according to the present invention, that if the attachment mechanism of the dolly includes means which permit the attachment mechanism to swivel or rotate in a seesaw manner, then the vehicle which is supported by the dolly can be rolled over uneven surfaces or bumps because the swiveling mechanism will enable the dolly to rotate in a seesaw manner to accommodate the bump or uneven surface.

It has further been discovered, according to the present invention, that if the present invention vehicle dolly includes clamping means, then the dolly can be clamped onto the rocker panel of the vehicle.

It has additionally been discovered, according to the present invention, that if a vehicle does not have rocker panels, the vehicle can be caused to rest on the present invention dolly by having an attachment which includes a transverse beam on which the vehicle rests and a pair of side beams which are supported by the clamping mechanism of the present invention.

It has also been discovered, according to the present invention, that if the dolly has wheels which can swivel, then the vehicle can be pushed in any direction by the swiveling wheels.

It has further been discovered, according to the present invention, that if the swivel means mechanism further comprises means to receive a locking bar, then the wheels can be locked to cause the dolly to enable the vehicle to move in only a straight direction such as when it is being towed up a ramp to a flat bed truck.

It has additionally been discovered, according to the present invention, that if the entire dolly is broken down into component parts which can be easily assembled in kit form, the entire dolly assembly can be easily transported.

It has also been discovered, according to the present invention, that if the wheels of the dolly are pressurized with 1000 psi, then the dolly can be used to push a vehicle to any location in any direction.

It is therefore an object of the present invention to create an vehicle dolly to transport a non-drivable vehicle to different locations in a repair shop and which has width adjust means to accommodate any size of vehicle.

It is also an object of the present invention to provide an vehicle dolly which can be attached to a vehicle such as by attachment to the vehicle rocker panel to facilitate movement and transportation of a non-drivable vehicle.

It is also an object of the present invention to provide a dolly which has means to permit the vehicle to rest on the dolly for transportation of a vehicle which does not have rocker panels.

It is a further object of the present invention to provide a dolly which includes means to permit its wheels to swivel so that the vehicle supported by the dolly can be pushed in any direction and further includes locking means which cause the wheels to lock so the vehicle can only be pushed or pulled in a straight direction.

It is another object of the present invention to provide a dolly which includes seesaw swiveling means to enable the vehicle which is supported by the dolly to go over uneven surfaces.

It is also an object of the present invention to provide a dolly in easily assembled and disassembled kit form so the dolly kit can be easily transported.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
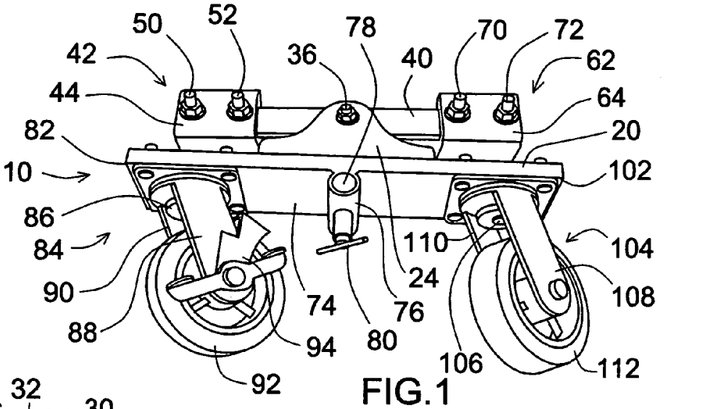
FIG. 1 is a perspective view of a wheel and bracket section of the present invention vehicle dolly, illustrating the swiveling motion of the wheels and illustrating the transverse bar attachment mechanism on the underside of the section platform.
Figure 2:
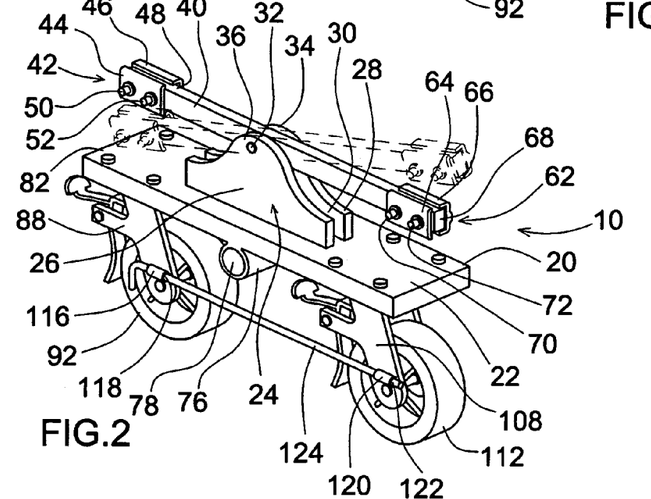
FIG. 2 is a perspective view of a wheel and bracket section of the present invention vehicle dolly, illustrating the wheels being locked and prevented from swiveling and illustrating in dashed lines the seesaw motion of the support bracket section.

Referring to FIGS. 1 and 2, there is illustrated the wheel and bracket section 10 which is a key component of the present invention vehicle dolly. The wheel and bracket section 10 is comprised of a horizontal platform 20 having an upper surface 22 onto which is attached a beam bracket 24 having a first wall 26, and a spaced apart parallel second wall 28 with a longitudinal space 30 therebetween. First wall 26 has a centrally disposed opening 32 and a second wall 28 has an aligned centrally disposed opening 34. A bolt assembly 36 is supported by aligned openings 32 and 34. A bracket beam 40 is rotatably supported on said bolt assembly 36 so that the bracket beam 40 can rotate within longitudinal space 30 in a seesaw manner as illustrated by the dashed lines in FIG. 2.

Bracket beam 40 is elongated and supports a clamping bracket at each end. First clamping bracket 42 has a first jaw 44 and a second jaw 46 which are movably mounted adjacent first end 48 of bracket beam 40. Jaw moving means which can be a pair of threaded bolts and nuts 50 and 52 supports the first and second jaw 44 and 46 adjacent first end 48 and by a conventional action of threading and tightening each bolt and nut assembly 50 and 52, first jaw 44 and second jaw 46 can be brought together to clamp an object between the jaws. Similarly, second clamping bracket 62 has a first jaw 64 and a second jaw 66 which are movably mounted adjacent second end 68 of bracket beam 40. Jaw moving means which can be a pair of threaded bolts and nuts 70 and 72 supports the first and second jaw 64 and 66 adjacent second end 68 and by conventional action of threading and tightening each bolt and nut assembly 70 and 72, first jaw 64 and second jaw 66 can be brought together to clamp an object between the jaws.

Referring to FIGS. 1 and 2, horizontal platform 20 has a lower surface 74. Centrally attached to lower surface 74 is receiving cylinder 76 having an interior channel 78 and a tightening screw 80 which extends into interior channel 78. Attached adjacent first end 82 of horizontal platform 20 on its lower surface 74 is a first swiveling wheel bracket 84 having swiveling mechanism 86 and first bracket wall 88 and second bracket wall 90 extending downwardly from swiveling mechanism 86. First and second bracket walls 88 and 90 are spaced apart and rotatably support first wheel 92 between them. Referring to FIG. 1, the bracket walls 88 and 90 support a wheel locking mechanism 94 which prevents the wheel 92 from rotating. Similarly, attached adjacent second end 102 of horizontal platform 20 on its lower surface 74 is a second swiveling wheel bracket 104 having swiveling mechanism 106 and first bracket wall 108 and second bracket wall 110 extending downwardly from swiveling mechanism 106. First and second bracket walls 108 and 110 are spaced apart and rotatably support second wheel 112 between them. The bracket walls 108 and 110 may also support a wheel locking mechanism which prevents the second wheel 112 from rotating. In an alternative embodiment illustrated in FIG. 2, first bracket wall 88 supports a locking cylinder 116 with a centrally disposed channel 118 therethrough and first bracket wall 108 also supports a locking cylinder 120 with a centrally disposed channel 122 therethrough. A transverse bar 124 extends through the interior channels of locking cylinders 116 and 120 to lock both wheels 92 and 112 simultaneously so that the wheels 92 and 112 cannot swivel and can only go in a straight line.

Figure 3:
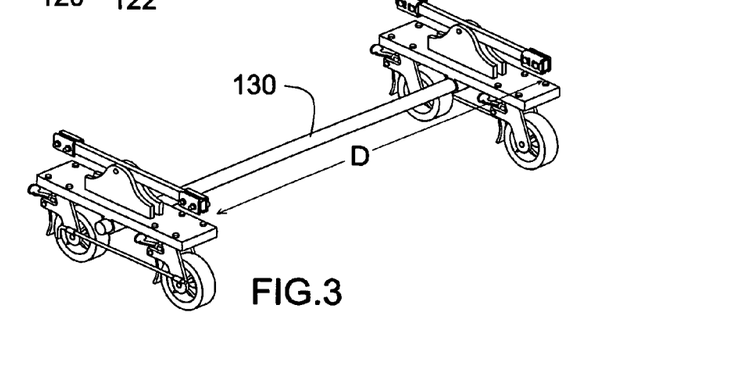
FIG. 3 is a perspective view of an assembled vehicle dolly of the present invention, illustrating a pair of parallel wheel and bracket sections interconnected by a transverse bar.

The wheel and bracket section 10 is the central component of the present invention dolly. Two wheel and bracket sections 10 can be assembled in various ways as part of the vehicle dolly kit of the present invention. The first embodiment as illustrated in FIG. 3 assumes that the vehicle is not drivable and that two opposite wheels of the vehicle have been removed or are both in place on the vehicle. This embodiment also assumes that the vehicle 200 (see FIG. 7) has a rocker panel 210.

Referring to FIG. 3, two oppositely disposed wheel and bracket sections 10 are aligned parallel to each other and are interconnected by a connecting rod 130 which extends through each respective interior channel 78 of the receiving cylinder 76 on the lower surface 74 of each horizontal platform 20 and is tightened therein by each respective tightening screw 80. The distance "D" between the respective parallel aligned jaws of the parallel wheel and bracket sections is sized to fit the lower width of the vehicle so that each jaw can be aligned with a respective rocker panel 210 on each side of the vehicle 200 and the jaws can be moved to clamp a portion of the rocker panel by the jaws.

Figure 4:
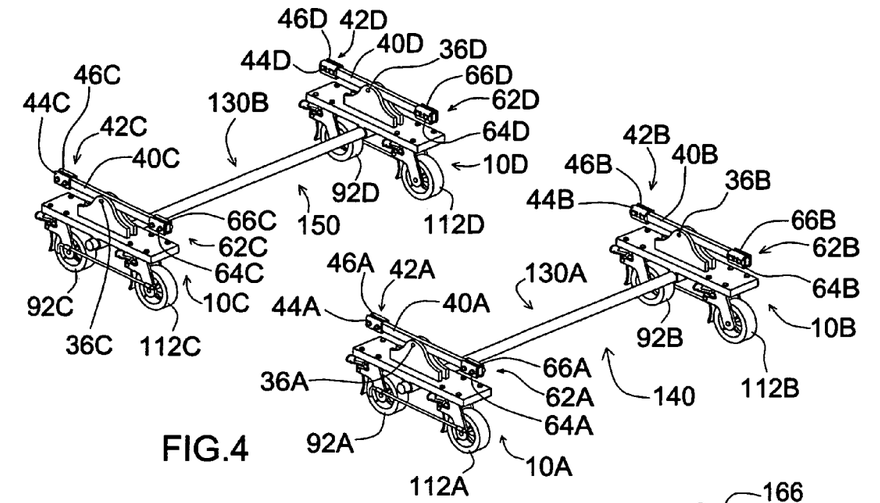
FIG. 4 is a perspective view of a pair of assembled vehicle dollies of the present invention.

As illustrated in FIG. 4, in the preferred embodiment, the vehicle dolly kit is comprised of two sets of interconnected wheel and bracket sections. First wheel and bracket dolly 140 is comprised of a first wheel and bracket section 10A, a second wheel and bracket section 10B interconnected by a first connecting rod 130A so that the distance "D" between parallel aligned jaws 42A and 42B and also 62A and 62B is sized to fit the lower width of the vehicle so that each saw can be aligned with a respective rocker panel 210 on opposite sides of the vehicle 200. As illustrated in FIG. 4, wheel and bracket sections 10A and 10B are parallel and similarly, wheel and bracket sections 10C and 10D of second wheel and bracket dolly 150 are parallel.

Figure 7:
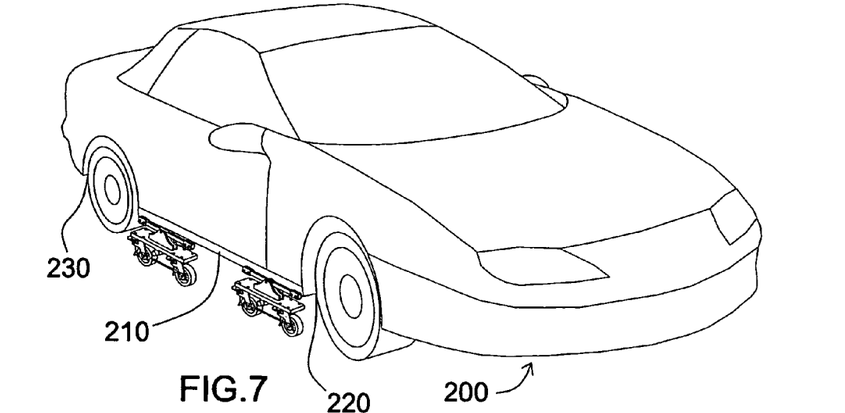
FIG. 7 is a perspective view of the present invention vehicle dolly attached to the rocker panel of a vehicle which has been damaged to enable rolling transportation of the vehicle.

In the embodiment illustrated in FIG. 7, wheels are on the vehicle 200. It is also possible to use the present invention when the wheels are removed from the vehicle. The end of the vehicle 200 onto which the present invention wheel and bracket dolly is to be placed is jacked up and the dolly assembly rolled under the vehicle so that a parallel set of wheel and bracket assemblies are positioned so that the respective jaws are aligned with the opposite rocker panels on the vehicle. By way of example, first wheel and bracket dolly 140 is positioned under vehicle 200 adjacent the front wheel wells 220 of vehicle 210 so that jaw 42A is aligned with rocker panel 210 and parallel jaw 42B is aligned with the rocker panel on the opposite side of the vehicle and saw 62A is aligned with rocker panel 210 and parallel jaw 62B is aligned with the rocker panel on the opposite side of the vehicle. Jaws sections 44A and 46A are clamped on opposite sides of the rocker panel 210 and tightened thereon and jaw sections 64A and 66A are clamped on opposite sides of rocker panel 210 and tightened thereon.

In a similar manner, jaw sections 44B and 46B and 64B and 66B are tightened onto the opposite rocker panel. Thereby, dolly 140 supports the front end of the vehicle 200. Similarly, the rear end of the vehicle is jacked up so that second wheel and bracket dolly 150 is positioned under vehicle 200 adjacent the rear wheel wells 230 of the vehicle 200 so that jaw 42C is aligned with rocker panel 210 and parallel jaw 42D is aligned with the rocker panel on the opposite side of the vehicle and jaw 62C is aligned with rocker panel 210 and parallel jaw 62D is aligned with the rocker panel on the opposite side of the vehicle by appropriate interconnection from second connecting rod 130B.

Jaw sections 44C and 46C are clamped on opposite sides of rocker panel 210 and tightened thereon and jaw sections 64C and 66C are clamped on opposite sides of rocker panel 210 and tightened thereon. In a similar manner, jaw sections 44D and 46D and 64D and 66D are tightened onto the opposite rocker panel. Thereby, the dolly 150 supports the rear end of the vehicle.

With the dollies 140 and 150 in place, the vehicle 200 can be pushed or pulled to any desired location in a repair shop. With wheels 92 and 112 in the swiveling condition and unlocked as illustrated in FIG. 1, the vehicle 200 can be turned in any direction to go around curves and obstacles. With the wheels 92 and 112 locked by transverse bar 124 as illustrated in FIG. 2, the wheels cannot turn and are forced to go in a straight line. This is desirable when towing the vehicle up the ramp of a flat bed truck or to just push or pull the vehicle in a straight line within the repair shop.

The ability of bracket beams 40A and 40B to swivel in a seesaw manner respectively about bolt 36A and 36B as illustrated in FIG. 2 enables the wheels 92A and 112A and 92B and 112B to go over bumps. The wheels are preferably pressurized at around 2400 psi to efficiently and securely transport the vehicle.

Through use of the present invention dolly, any length and width vehicle can be easily and efficiently moved around a repair shop or onto a transport vehicle.

Figure 5:
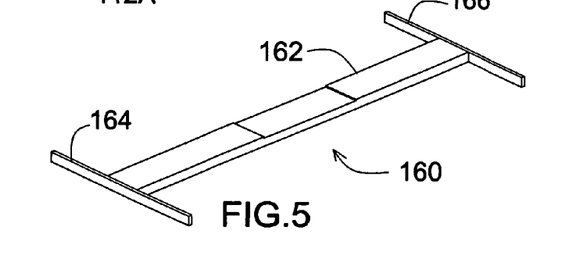
FIG. 5 is a perspective view of a transverse beam which is used with the present invention vehicle dolly for use with a vehicle which does not have rocket panels.
Figure 6:
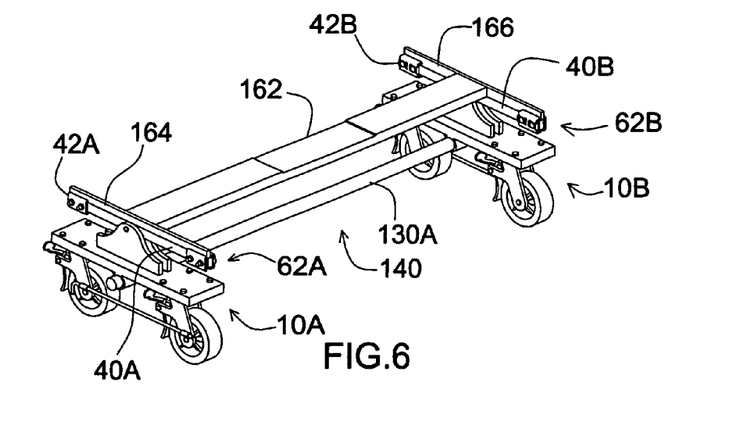
FIG. 6 is a perspective view of the beam illustrated in FIG. 5 attached to the clamping portions of a pair of interconnected wheel and bracket sections so that a vehicle without rocker panels can be caused to rest on the beam.

The alternative embodiment of the present invention illustrated in FIGS. 5 and 6 is used with a vehicle that does not have rocker panels. The key additional component is a resting platform assembly 160 which is comprised of a flat longitudinal beam member 162 having a first side transverse beam 164 on one end and a second side transverse beam 166 on its opposite end. As illustrated in FIG. 6, first side transverse beam 164 is clamped by jaws 42A and 62A of first wheel and bracket section 10A and second side transverse beam 166 is clamped by jaws 42B and 62B of second wheel and bracket section 10B so that flat longitudinal beam member 162 is supported between the wheel and bracket sections 10A and 10B. The vehicle 200 is jacked up and the assembly placed under the vehicle adjacent either the front wheel well 220, adjacent the rear wheel well 230 or two such assemblies are placed under the vehicle respectively adjacent the front and rear wheel wells. The vehicle 210 then rests on beam 162 and can be pushed and pulled and caused to go in a turn or caused to go in a straight direction through the manner previously described.

Figure 8:
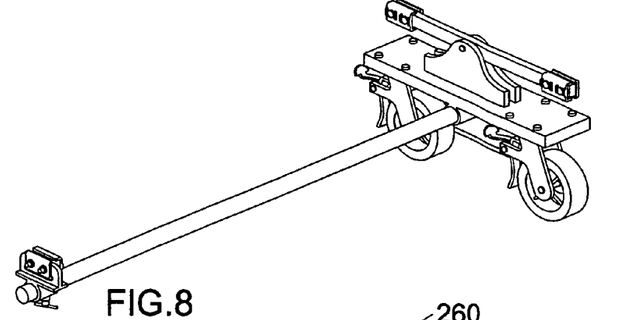
FIG. 8 is a perspective view of an alternative embodiment of the present invention vehicle dolly which is used with a vehicle that has one wheel removed from its front or back while the opposite side of the vehicle still has a wheel thereon.
Figure 9:
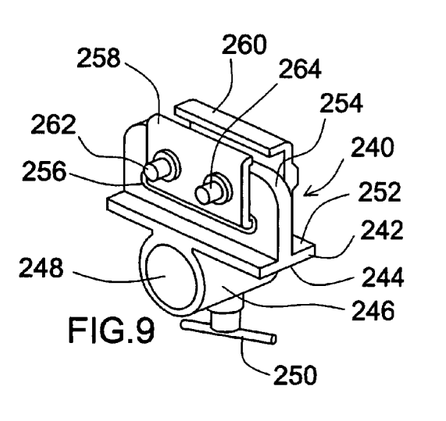
FIG. 9 is a perspective view of the clamping mechanism of the alternative embodiment illustrated in FIG. 8, which clamping mechanism is on the side with the attached wheel.
Figure 10:
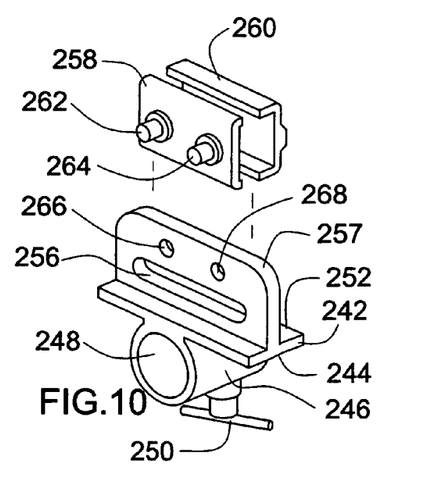
FIG. 10 is an exploded perspective view of the clamping mechanism illustrated in FIG. 9.

Another alternative embodiment of the present invention is illustrated in FIGS. 8 through 10 and is used when the vehicle has only one wheel removed and the parallel location still has its wheel in place. In this case, a wheel and bracket assembly is positioned on the side where the wheel has been removed and the opposite side which has the wheel in place has a clamping assembly attached to the rocker panel at a location adjacent the wheel well where the wheel is positioned. Clamping bracket 240 has a horizontal platform 242 having a lower surface 244 to which is attached a receiving cylinder 246 having an interior channel 248 and a tightening screw 250. A vertical wall 254 extends transversely to the upper surface 252 of horizontal platform 242. The vertical wall 254 has a transverse slot 256 therethrough. A first jaw 258 and a second jaw 260 are on opposite sides of the vertical wall 254 and are interconnected through transverse slot 256 and are also movably interconnected by first bolt and nut assembly 262 and second bolt and nut assembly 264. First bolt and nut assembly 262 extends through opening 261 in transverse wall 254 and second bolt and nut assembly 264 extends through opening 268 in transverse wall 254. The clamping bracket 240 is affixed to the rocker panel 210 with jaws 258 and 260 clamped onto and tightened onto rocker panel 210.

Therefore, through use of the present invention, the present invention provides a kit to enable a person to move a disabled vehicle with all four wheels in place, all four wheels removed, or any combination of one wheel removed and the parallel wheel in place. The present invention automobile dolly can be clamped to the rocker panel of the vehicle or fitted with the resting platform assembly 160 so the vehicle can rest on the platform assembly supported by a pair of wheel and bracket sections of the present invention. The connector rod 130 can be affixed inside respective parallel aligned receiving cylinders 76 so that the distance between the jaws of parallel aligned clamping brackets can be sized to fit the width of any vehicle so that the jaws are aligned with a respective rocker panel.

The present invention vehicle dolly is in kit form so that the components can be easily disassembled, transported to another location, and then reassembled.

Defined in detail, the present invention is a vehicle dolly for use with a vehicle of a given width and having a rocker panel on each side, comprising: (a) a first wheel and bracket section further comprising a horizontal platform having an upper surface and a lower surface, a first end and a second end, a first beam bracket extending upwardly from the upper surface, the first beam bracket having a first wall and a spaced apart parallel second wall with a longitudinal space therebetween, each wall having an aligned central opening with a bolt assembly extending through the aligned openings, a first bracket beam rotatably supported on the bolt assembly so that the bracket beam can rotate within the longitudinal space in a seesaw manner, the first bracket beam having a pair of movable jaw members respectively supported adjacent the first and second ends of the bracket beam, each jaw member having a first and second jaw section which can be moved toward each other to clamp an object between the jaws, a first receiving cylinder centrally attached to the lower surface of the horizontal platform, the first receiving cylinder having an interior channel and a tightening screw extending into the interior channel, a first swiveling wheel bracket rotatably attached to the lower surface of the horizontal platform adjacent its first end and rotatably supporting a first wheel and a second swiveling wheel bracket rotatably attached to the lower surface of the horizontal platform adjacent its second end and rotatably supporting a second wheel; (b) a second wheel and bracket section further comprising a horizontal platform having an upper surface and a lower surface, a first end and a second end, a second beam bracket extending upwardly from the upper surface, the second beam bracket having a first wall and a spaced apart parallel second wall with a longitudinal space therebetween, each wall having an aligned central opening with a bolt assembly extending through the aligned openings, a second bracket beam rotatably supported on the bolt assembly so that the bracket beam can rotate within the longitudinal space in a seesaw manner, the second bracket beam having a pair of movable jaw members respectively supported adjacent the first and second ends of the bracket beam, each jaw member having a first and second jaw section which can be moved towards each other to clamp an object between the jaws, a second receiving cylinder centrally attached to the lower surface of the horizontal platform, the second receiving cylinder having an interior channel and a tightening screw extending into the interior channel, a first swiveling wheel bracket rotatably attached to the lower surface of the horizontal platform adjacent its first end and rotatably supporting a first wheel and a second swiveling wheel bracket rotatably attached to the lower surface of the horizontal platform adjacent its second end and rotatably supporting a second wheel; and (c) an interconnecting rod having a first and a second end, the first end inserted into the interior channel of the first receiving cylinder and tightened therein, the second end inserted into the interior channel of the second receiving cylinder and tightened therein, the interconnecting rod positioned so that the jaws of the first bracket beam are aligned with the rocker panel on one side of the vehicle with each jaw clamping a portion of that rocker panel, and the jaws of the second bracket beam are aligned with the rocker panel on the opposite side of the vehicle with each jaw clamping a portion of that rocker panel, so that a portion of the vehicle is supported by the first and second wheels and bracket sections and can be moved by pushing or pulling the vehicle with the wheels of the first and second bracket sections facilitating such movement.

Defined broadly, the present invention is a vehicle dolly for use with a vehicle of a given width and having a rocker panel on each side, comprising: (a) a first wheel and bracket section further comprising a horizontal platform having an upper surface and a lower surface, a first end and a second end, a first bracket beam rotatably supported by support means of the upper surface of the horizontal platform so that the first bracket beam can rotate in a vertically oriented seesaw manner, the first bracket beam movably supporting a pair of jaws adjacent its first and second ends, which jaws can be caused to clamp an object between the jaws, a first receiving means affixed to the lower surface of the horizontal platform, and a pair of swiveling wheel brackets respectively rotatably supported on the lower surface of the horizontal platform adjacent the first and second ends, each swiveling wheel bracket rotatably supporting a wheel; (b) a second wheel and bracket section further comprising a horizontal platform having an upper surface and a lower surface, a first end and a second end, a second beam bracket rotatably supported by support means on the upper surface of the horizontal platform so that the second beam bracket can rotate in a vertically oriented seesaw manner, the second bracket beam movably supporting a pair of jaws adjacent its first and second ends, which jaws can be caused to clamp an object between the jaws, a second receiving means affixed to the lower surface of the horizontal platform, and a pair of swiveling wheel brackets respectively rotatably supported on the lower surface of the horizontal platform adjacent the first and second ends, each swiveling wheel bracket rotatably supporting a wheel; and (c) interconnecting means having a first end and a second end, the first end retained by the first receiving means and the second end retained by the second means, the interconnecting means positioned so that the jaws of the first bracket beam are aligned with the rocker panel on one side of the vehicle with each jaw clamping a portion of that rocker panel and the jaws of the second bracket beam are aligned with the rocker panel on the opposite side of the vehicle with each jaw clamping a portion of that rocker panel, so that a portion of the vehicle is supported by the first and second wheel and bracket sections and can be moved by pushing or pulling the vehicle with the wheels of the first and second bracket section facilitating its movement.

Defined alternatively in detail, the present invention is a vehicle dolly for use with a vehicle of a given width, comprising: (a) a first wheel and bracket section further comprising a horizontal platform having an upper surface and a lower surface, a first end and a second end, a first beam bracket extending upwardly from the upper surface, the first beam bracket having a first wall and a spaced apart parallel second wall with a longitudinal space therebetween, each wall having an aligned central opening with a bolt assembly extending through the aligned openings, a first bracket beam rotatably supported on the bolt assembly so that the bracket beam can rotate within the longitudinal space in a seesaw manner, the first bracket beam having a pair of movable jaw members respectively supported adjacent the first and second ends of the bracket beam, each jaw member having a first and second jaw section which can be moved toward each other to clamp an object between the jaws, a first receiving cylinder centrally attached to the lower surface of the horizontal platform, the first receiving cylinder having an interior channel and a tightening screw extending into the interior channel, a first swiveling wheel bracket rotatably attached to the lower surface of the horizontal platform adjacent its first end and rotatably supporting a first wheel and a second swiveling wheel bracket rotatably attached to the lower surface of the horizontal platform adjacent its second end and rotatably supporting a second wheel; (b) a second wheel and bracket section further comprising a horizontal platform having an upper surface and a lower surface, a first end and a second end, a second beam bracket extending upwardly from the upper surface, the second beam bracket having a first wall and a spaced apart parallel second wall with a longitudinal space therebetween, each wall having an aligned central opening with a bolt assembly extending through the aligned openings, a second bracket beam rotatably supported on the bolt assembly so that the bracket beam can rotate within the longitudinal space in a seesaw manner, the second bracket beam having a pair of movable jaw members respectively supported adjacent the first and second ends of the bracket beam, each jaw member having a first and second jaw section which can be moved towards each other to clamp an object between the jaws, a second receiving cylinder centrally attached to the lower surface of the horizontal platform, the second receiving cylinder having an interior channel and a tightening screw extending into the interior channel, a first swiveling wheel bracket rotatably attached to the lower surface of the horizontal platform adjacent its first end and rotatably supporting a first wheel and a second swiveling wheel bracket rotatably attached to the lower surface of the horizontal platform adjacent its second end and rotatably supporting a second wheel; and (c) a resting platform comprised of a flat longitudinal beam member having a first end and a second end, a first side transverse beam affixed to the first end of the flat longitudinal beam member and a second side transverse beam affixed to the second end of the flat longitudinal beam member, the first and second transverse beams being parallel to each other, the length of the flat longitudinal beam being sized to extend under the width of the vehicle, the first transverse beam being clamped by the jaws of the first bracket beam and the second transverse beam being clamped by the jaws of the second bracket beam so that a portion of the vehicle is supported by resting on the flat longitudinal beam member and can be moved by pushing or pulling the vehicle with the wheels of the first and second bracket sections facilitating such movement.

Defined even more broadly, the present invention is a vehicle dolly for use with a vehicle of a given width, comprising: (a) a first wheel and bracket section further comprising a horizontal platform having an upper surface and a lower surface, a first end and a second end, a first bracket beam rotatably supported by support means of the upper surface of the horizontal platform so that the first bracket beam can rotate in a vertically oriented seesaw manner, the first bracket beam movably supporting a pair of jaws adjacent its first and second ends, which jaws can be caused to clamp an object between the jaws, a first receiving means affixed to the lower surface of the horizontal platform, and a pair of swiveling wheel brackets respectively rotatably supported on the lower surface of the horizontal platform adjacent the first and second ends, each swiveling wheel bracket rotatably supporting a wheel; (b) a second wheel and bracket section further comprising a horizontal platform having an upper surface and a lower surface, a first end and a second end, a second beam bracket rotatably supported by support means on the upper surface of the horizontal platform so that the second beam bracket can rotate in a vertically oriented seesaw manner, the second bracket beam movably supporting a pair of jaws adjacent its first and second ends, which jaws can be caused to clamp an object between the jaws, a second receiving means affixed to the lower surface of the horizontal platform, and a pair of swiveling wheel brackets respectively rotatably supported on the lower surface of the horizontal platform adjacent the first and second ends, each swiveling wheel bracket rotatably supporting a wheel; and (c) a resting platform comprised of a flat longitudinal beam member having a first end and a second end, a first side transverse beam affixed to the first end of the flat longitudinal beam member and a second side transverse beam affixed to the second end of the flat longitudinal beam member, the first and second transverse beams being parallel to each other, the length of the flat longitudinal beam being sized to extend under the width of the vehicle, the first transverse beam being clamped by the jaws of the first bracket beam and the second transverse beam being clamped by the jaws of the second bracket beam so that a portion of the vehicle is supported by resting on the flat longitudinal beam member and can be moved by pushing or pulling the vehicle with the wheels of the first and second bracket sections facilitating such movement.

Defined also alternatively in detail, the present invention is a vehicle dolly for use with a vehicle of a given width and having a rocker panel on each side, comprising: (a) a first wheel and bracket section further comprising a horizontal platform having an upper surface and a lower surface, a first end and a second end, a first beam bracket extending upwardly from the upper surface, the first beam bracket having a first wall and a spaced apart parallel second wall with a longitudinal space therebetween, each wall having an aligned central opening with a bolt assembly extending through the aligned openings, a first bracket beam rotatably supported on the bolt assembly so that the bracket beam can rotate within the longitudinal space in a seesaw manner, the first bracket beam having a pair of movable jaw members respectively supported adjacent the first and second ends of the bracket beam, each jaw member having a first and second jaw section which can be moved toward each other to clamp an object between the jaws, a first receiving cylinder centrally attached to the lower surface of the horizontal platform, the first receiving cylinder having an interior channel and a tightening screw extending into the interior channel, a first swiveling wheel bracket rotatably attached to the lower surface of the horizontal platform adjacent its first end and rotatably supporting a first wheel and a second swiveling wheel bracket rotatably attached to the lower surface of the horizontal platform adjacent its second end and rotatably supporting a second wheel; (b) a clamping bracket further comprising a horizontal platform having a lower surface and an upper surface, a receiving cylinder attached to the lower surface of the horizontal platform, the receiving cylinder having an interior channel and a tightening screw extending into the channel, a vertical wall extending upwardly from the upper surface of the horizontal platform and a movable jaw member supported on the vertical wall, the jaw member having first and second jaw sections which can be moved toward each other to clamp an object between the jaws; and (c) an interconnecting rod having a first end and a second end, the first end inserted into the interior channel of the first receiving cylinder of the first wheel and bracket section and tightened therein, the second end inserted into the interior channel of the receiving cylinder of the clamping bracket and tightened therein, the interconnecting rod positioned so that the jaws of the first bracket beam of the first wheel and bracket section are aligned with the rocker panel on the side of the vehicle where the wheel has been removed with each jaw clamping a portion of that rocker panel and the jaw of the clamping member aligned with the rocker panel on the side of the vehicle where the wheel is still in place, the jaw of the clamping bracket clamping a portion of the rocker panel on that side of the vehicle, so that a portion of the vehicle is supported by the first and second wheels of the first bracket section and by the wheel in place on the vehicle and can be moved by pushing or pulling the vehicle with the wheels of the first wheel and bracket section and wheel of the vehicle facilitating such movement.

Defined even more broadly, the present invention is a vehicle dolly for use with a vehicle of a given width and having a rocker panel on each side, with a wheel in place on the first side and the wheel removed from the opposite location on the second side, the vehicle dolly comprising: (a) a first wheel and bracket section further comprising a horizontal platform having an upper surface and a lower surface, a first end and a second end, a first bracket beam rotatably supported by support means of the upper surface of the horizontal platform so that the first bracket beam can rotate in a vertically oriented seesaw manner, the first bracket beam movably supporting a pair of jaws adjacent its first and second ends, which jaws can be caused to clamp an object between the jaws, a first receiving means affixed to the lower surface of the horizontal platform, and a pair of swiveling wheel brackets respectively rotatably supported on the lower surface of the horizontal platform adjacent the first and second ends, each swiveling wheel bracket rotatably supporting a wheel; (b) a clamping bracket comprising a horizontal platform having a lower surface and an upper surface, a receiving means affixed to the lower surface of the horizontal platform, a vertical wall extending upwardly from the horizontal platform and a movable jaw supported on the vertical wall which movable jaw can be caused to clamp an object; and (c) an interconnecting means having a first end and a second end, the first end retained by the first receiving means of the first wheel and bracket section and the second end retained by the receiving means of the clamping bracket, the interconnecting means positioned so that the jaws of the first bracket beam are aligned with the rocker panel on the side of the vehicle where the wheel has been removed with each jaw clamping a portion of that rocker panel, the jaw of the clamping member aligned with the rocker panel on the side of the vehicle where the wheel is still in place, the jaw of the clamping bracket clamping a portion of the rocker panel on that side of the vehicle, so that a portion of the vehicle is supported by the first and second wheels of the first bracket section and the wheel in place on the vehicle and can be moved by pushing or pulling the vehicle with the wheels of the first wheel and bracket section and wheel of the vehicle facilitating such movement.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A vehicle dolly for use with a vehicle of a given width, comprising:
   a. a first wheel and bracket section further comprising a horizontal platform having an upper surface and a lower surface, a first end and a second end, a first beam bracket extending upwardly from the upper surface, the first beam bracket having a first wall and a spaced apart parallel second wall with a longitudinal space therebetween, each wall having an aligned central opening with a bolt assembly extending through the aligned openings, a first bracket beam rotatably supported on said bolt assembly so that the bracket beam can rotate within the longitudinal space in a seesaw manner, the first bracket beam having a pair of movable jaw members respectively supported adjacent the first and second ends of the bracket beam, each jaw member having a first and second jaw section which can be moved toward each other to clamp an object between the jaws, a first receiving cylinder centrally attached to the lower surface of the horizontal platform, the first receiving cylinder having an interior channel and a tightening screw extending into the interior channel, a first swiveling wheel bracket rotatably attached to the lower surface of the horizontal platform adjacent its first end and rotatably supporting a first wheel and a second swiveling wheel bracket rotatably attached to the lower surface of the horizontal platform adjacent its second end and rotatably supporting a second wheel;
   b. a second wheel and bracket section further comprising a horizontal platform having an upper surface and a lower surface, a first end and a second end, a second beam bracket extending upwardly from the upper surface, the second beam bracket having a first wall and a spaced apart parallel second wall with a longitudinal space therebetween, each wall having an aligned central opening with a bolt assembly extending through the aligned openings, a second bracket beam rotatably supported on said bolt assembly so that the bracket beam can rotate within the longitudinal space in a seesaw manner, the second bracket beam having a pair of movable jaw members respectively supported adjacent the first and second ends of the bracket beam, each jaw member having a first and second jaw section which can be moved towards each other to clamp an object between the jaws, a second receiving cylinder centrally attached to the lower surface of the horizontal platform, the second receiving cylinder having an interior channel and a tightening screw extending into the interior channel, a first swiveling wheel bracket rotatably attached to the lower surface of the horizontal platform adjacent its first end and rotatably supporting a first wheel and a second swiveling wheel bracket rotatably attached to the lower surface of the horizontal platform adjacent its second end and rotatably supporting a second wheel; and c. a resting platform comprised of a flat longitudinal beam member having a first end and a second end, a first side transverse beam affixed to the first end of the flat longitudinal beam member and a second side transverse beam affixed to the second end of the flat longitudinal beam member, the first and second transverse beams being parallel to each other, the length of the flat longitudinal beam being sized to extend under the width of the vehicle, the first transverse beam being clamped by the jaws of the first bracket beam and the second transverse beam being clamped by the jaws of the second bracket beam so that a portion of the vehicle is supported by resting on the flat longitudinal beam member and can be moved by pushing or pulling the vehicle with the wheels of the first and second bracket sections facilitating such movement.

2. A vehicle dolly in accordance with claim 1, further comprising an interconnecting rod having a first end and a second end, the first end inserted into the interior channel of the first receiving cylinder and tightened therein, the second end inserted into the interior channel of the second receiving cylinder and tightened therein, the interconnecting rod positioned so that the underside of the vehicle rests on the flat longitudinal beam member.

3. The vehicle dolly in accordance with claim 1, wherein at least one wheel of each wheel and bracket section has locking means on its wheel bracket to prevent the wheel from rotating.

4. The vehicle dolly in accordance with claim 1, wherein each wheel bracket further comprises a locking cylinder through which a transverse bar is inserted to cause the wheels to only move in a straight line and prevent the wheels from swiveling.

5. The vehicle dolly in accordance with claim 1, further comprising two sets of interconnected first and second wheel and bracket sections which are spaced apart underneath the vehicle and respectively clamped to spaced apart locations on each respective rocker panel.

6. A vehicle dolly for use with a vehicle of a given width, comprising:
   a. a first wheel and bracket section further comprising a horizontal platform having an upper surface and a lower surface, a first end and a second end, a first bracket beam rotatably supported by support means of the upper surface of the horizontal platform so that the first bracket beam can rotate in a vertically oriented seesaw manner, the first bracket beam movably supporting a pair of jaws adjacent its first and second ends, which jaws can be caused to clamp an object between the jaws, a first receiving means affixed to the lower surface of the horizontal platform, and a pair of swiveling wheel brackets respectively rotatably supported on the lower surface of the horizontal platform adjacent the first and second ends, each swiveling wheel bracket rotatably supporting a wheel;
   b. a second wheel and bracket section further comprising a horizontal platform having an upper surface and a lower surface, a first end and a second end, a second beam bracket rotatably supported by support means on the upper surface of the horizontal platform so that the second beam bracket can rotate in a vertically oriented seesaw manner, the second bracket beam movably supporting a pair of jaws adjacent its first and second ends, which jaws can be caused to clamp an object between the jaws, a second receiving means affixed to the lower surface of the horizontal platform, and a pair of swiveling wheel brackets respectively rotatably supported on the lower surface of the horizontal platform adjacent the first and second ends, each swiveling wheel bracket rotatably supporting a wheel; and
   c. a resting platform comprised of a flat longitudinal beam member having a first end and a second end, a first side transverse beam affixed to the first end of the flat longitudinal beam member and a second side transverse beam affixed to the second end of the flat longitudinal beam member, the first and second transverse beams being parallel to each other, the length of the flat longitudinal beam being sized to extend under the width of the vehicle, the first transverse beam being clamped by the jaws of the first bracket beam and the second transverse beam being clamped by the jaws of the second bracket beam so that a portion of the vehicle is supported by resting on the flat longitudinal beam member and can be moved by pushing or pulling the vehicle with the wheels of the first and second bracket sections facilitating such movement.

7. A vehicle dolly in accordance with claim 6, further comprising an interconnecting means having a first end and a second end, the first end retained by the first receiving means and the second end retained by the second receiving means, the interconnecting means positioned so that the underside of the vehicle rests on the flat longitudinal beam member.

8. The vehicle dolly in accordance with claim 6, wherein at least one wheel of each wheel and bracket section has locking means on its wheel bracket to prevent the wheel from rotating.

9. The vehicle dolly in accordance with claim 6, wherein each wheel bracket further comprises a locking cylinder through which a transverse bar is inserted to cause the wheels to only move in a straight line and prevent the wheels from swiveling.

10. The vehicle dolly in accordance with claim 6, further comprising two sets of interconnected first and second wheel and bracket sections which are spaced apart underneath the vehicle and respectively clamped to spaced apart locations on each respective rocker panel.

* * * * *